(12) United States Patent  
Baird (10) Patent No.: US 9,063,905 B2
(45) Date of Patent: Jun. 23, 2015

(54) SYSTEM AND METHOD FOR VIRTUALIZED SHARED USE ENVIRONMENT WITH DYNAMIC IP ADDRESS INJECTION

(71) Applicant: Steven Lloyd Baird, Colfax, CA (US)

(72) Inventor: Steven Lloyd Baird, Colfax, CA (US)

( * ) Notice: Subject to any disclaimer, the term of this patent is extended or adjusted under 35 U.S.C. 154(b) by 279 days.

(21) Appl. No.: 13/900,432

(22) Filed: May 22, 2013

(65) Prior Publication Data

US 2014/0351623 A1 Nov. 27, 2014

(51) Int. Cl.
*G06F 15/16* (2006.01)
*G06F 11/20* (2006.01)

(52) U.S. Cl.
CPC ..................................... *G06F 11/20* (2013.01)

(58) Field of Classification Search
None
See application file for complete search history.

(56) References Cited

U.S. PATENT DOCUMENTS

| | | | |
|---|---|---|---|
| 6,961,806 B1* | 11/2005 | Agesen et al. | 711/6 |
| 2009/0083683 A1* | 3/2009 | Snell | 716/5 |
| 2009/0276771 A1* | 11/2009 | Nickolov et al. | 717/177 |
| 2009/0288084 A1* | 11/2009 | Astete et al. | 718/1 |
| 2010/0125844 A1* | 5/2010 | Mousseau et al. | 718/1 |
| 2011/0004676 A1* | 1/2011 | Kawato | 709/221 |
| 2011/0040575 A1* | 2/2011 | Wright et al. | 705/3 |
| 2012/0278801 A1* | 11/2012 | Nelson et al. | 718/1 |
| 2013/0205295 A1* | 8/2013 | Ebcioglu et al. | 718/1 |

* cited by examiner

*Primary Examiner* — Kenny Lin (57) ABSTRACT

Virtualized Shared Use Environment—database driven selector of specific a) company software, b) equipment location, and c) peripherals available. The selected elements together create a Virtualized Hypercart (VH) which carries all the variable elements necessary to select the appropriate running virtual machine. Derived from the above information, the system control software (SCS) selects from a table of available virtual machines that match the requirements of company software, equipment location, peripherals available and from the company software selection, the IP addressing schemes required and available for use by the virtual machine. Dynamic IP Address Injection—based on the VH, the IP addressing scheme is injected into the virtual machine that contains the appropriate company software for the type of location that made the request with the peripherals available for use by the virtual machine.

7 Claims, 16 Drawing Sheets

SYSTEM AND METHOD FOR VIRTUALIZED SHARED USE ENVIRONMENT WITH DYNAMIC IP ADDRESS INJECTION

BACKGROUND OF THE INVENTION

1. Field of Invention

The present invention is generally related to shared or common use systems where multiple types of software operate on virtual machines that are managed by system control software.

2. Description of Related Art

Common use systems have been available in the airport/airline industry for a number of years. It is only in recent history that the technology has caught up to enable the creation of a truly dynamic shared use environment.

Common use architectures required middleware to wrap around and control the airline software. Localized hardware contained images of the middleware wrapped airline software on a partition on the hard drive. Upon a request from an operator, the partition containing the software combination would boot and become an active session. The operator was required to wait for the boot to initialize the operating system then the particular company (airline) software. All peripherals were controlled by the middleware including but not limited to printers, MCR/OCR readers, magnetic stripe readers, bar code readers, boarding pass printers, ticket printers and baggage tag printers. The amount of time required to initiate a session in this configuration took several minutes.

Common use terminal equipment (CUTE) systems also required certification by the middleware vendors to validate that the airline software would operate in their middleware controlled environment. This common environment required airlines to both write their code to satisfy the middleware vendors as well as pay those same vendors to certify their software for use on the vendors' system middleware.

With the advent of shared use systems, the system control software was not required to wrap an airline application and therefore certification was not necessary. If the airline application operated in their native environment on their own local area networks (LAN), then the application would run in a shared use environment without modification. Unfortunately, these early shared use environments required boot partitions similar to the older common use systems.

With the advent of virtual machines, shared use systems can now reach their peak efficiency by creating virtual machines of the appropriate company software based on time-of-day requirements. Shared use in a virtualized environment will make the company software available near instantaneously without having to wait for the edge computing device to switch partitions and boot. Dynamically injecting the IP addressing into the virtual machine enables any edge computing device to serve any company without the issue of a limited number of company IP addresses available.

SUMMARY OF THE INVENTION

Embodiments of the present invention provide a solution that fosters a shared use environment that has virtual machines available through the network on multiple servers that are available to operators near instantaneously once the company software is selected and the user is validated to operate that software.

In one embodiment, the present invention is implemented using system control software that controls the virtual machines and which software configurations are running on them as well IP addressing control and hardware location management.

In one embodiment, a selection of available company software is offered to the operator.

In one embodiment, system control software will initiate the appropriate number of virtual machines running company/location combinations based on time-of-day requirements based on the Resource Management System of the software control system which contains the schedule of hardware requirements.

In one embodiment, once software is selected, the system control software creates a virtualized hypercart which contains the company software selected, the MAC address of the hardware of the edge computing device on which the selection was made then retrieves the IP addressing scheme based those two attributes.

In one embodiment, a session ID is created to track the primary and secondary virtual machines operating the appropriate company/location software combination.

In one embodiment, the dynamically retrieved IP addressing scheme is injected into the primary and secondary virtual machines.

In one embodiment, both the primary and secondary virtual machines are switched into the company's VLAN through the network interface card (NIC) controller on the servers housing the virtual machine pool.

In one embodiment, corruption of a primary virtual machine initiates the promotion of the secondary virtual machine to primary; the spawning of a new secondary machine to mirror the primary virtual machine and a tear down of the faulty virtual machine to an available state.

In one embodiment, corruption of a secondary virtual machine initiates the spawning of a new secondary machine to mirror the primary virtual machine and a tear down of the faulty virtual machine to an available state.

In one embodiment, an edge computing device requiring replacement triggers the need for maintenance personnel to correct the location table the system control software relies upon to differentiate where the edge computing device is in the environment.

In one embodiment, when companies need to update/upgrade their software, they can update the master copy through their VLAN at any time. The system control software will detect the software change and file an image of the new software from which future virtual machines are spawned.

DETAILED DESCRIPTION OF THE INVENTION

The following example embodiments and their aspects are described and illustrated in conjunction with apparatuses, methods, and systems which are meant to be illustrative examples, not limiting in scope.

Figure 1:
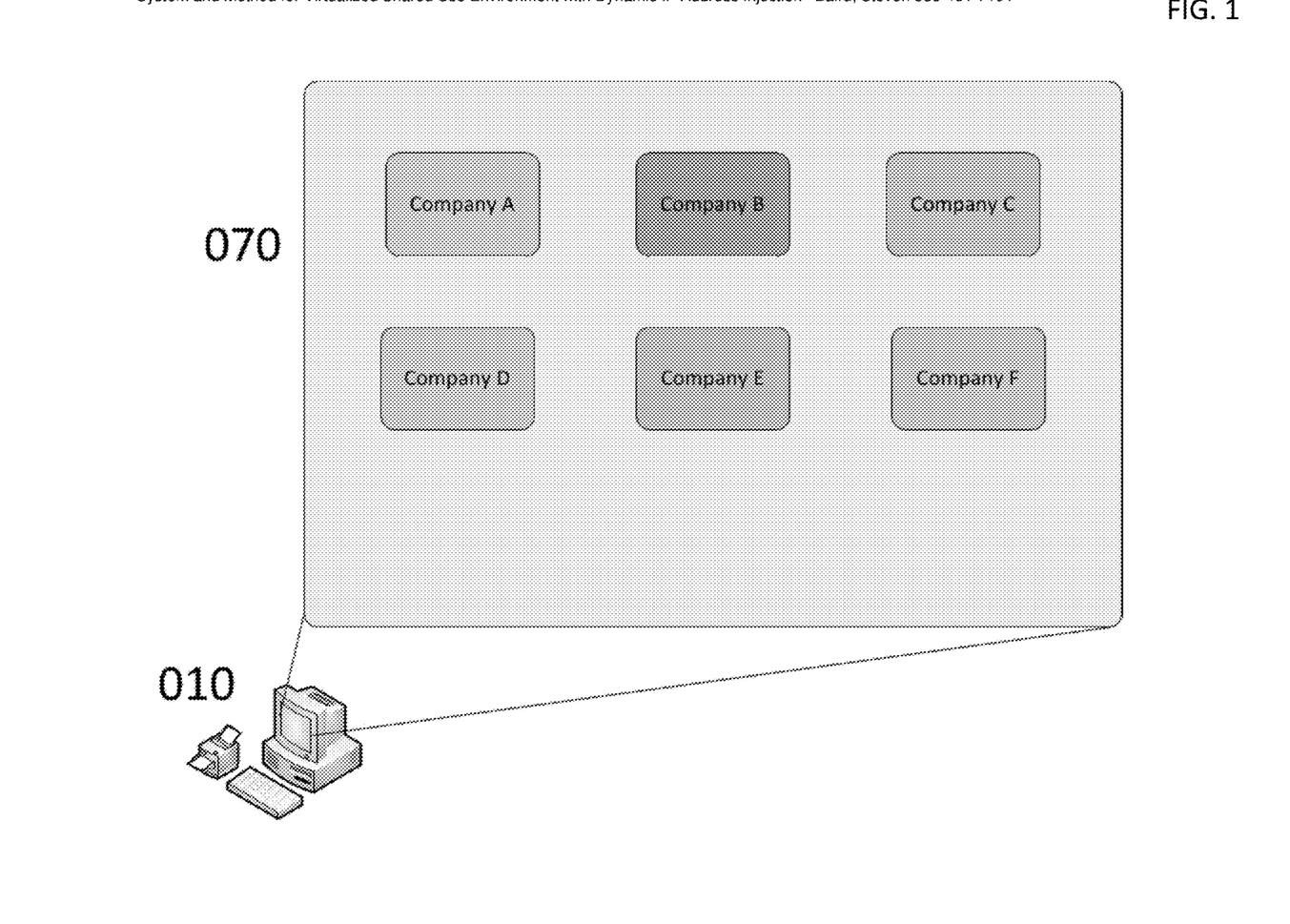
FIG. 1 is a diagram showing a menu of company software choices on an edge computing device.

Menu Presentation—FIG. 1 depicts a menu 070 of company software available to run from edge computing device 010. Selection of the software by the operator will be transmitted to the system control software through the local area network (LAN).

Figure 2:
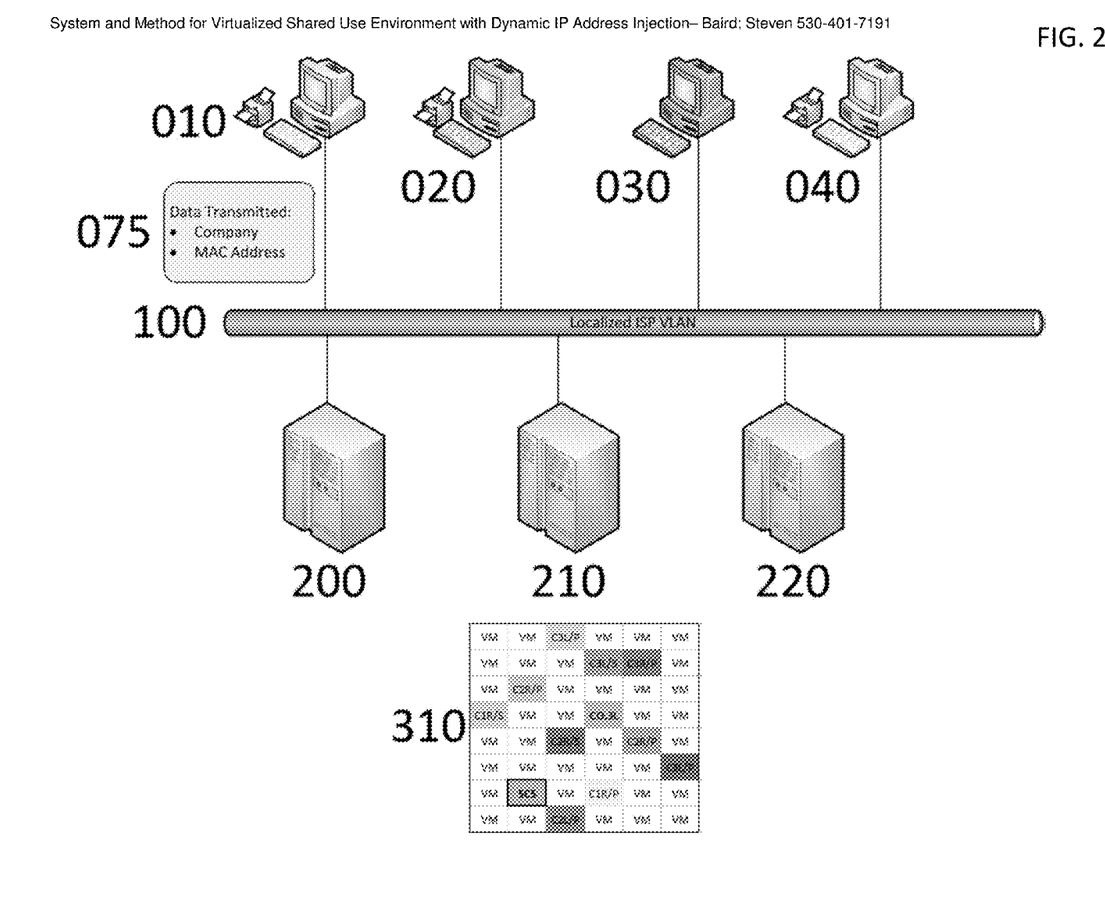
FIG. 2 is a diagram showing the selected instruction set transmitted through the local area network to the system control software.
Figure 3:
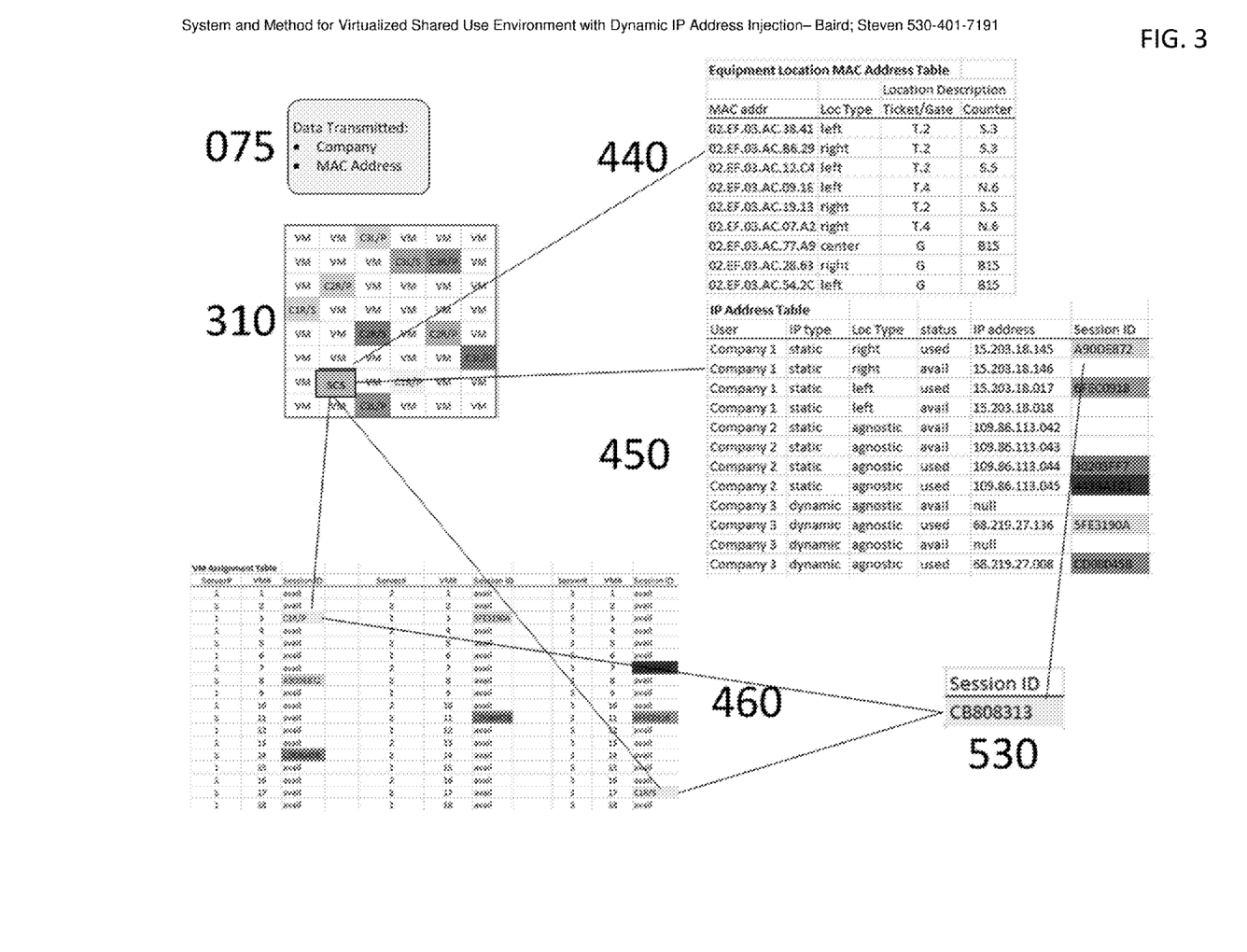
FIG. 3 is a diagram showing the system control software conversing with several database tables to determine the appropriate virtual machine for the request.

Virtual Machine Selection—In FIG. 2, the instruction set 075 is sent from edge computing device 010 through LAN 100 to the system control software running on a virtual machine 310 running on server 210. Upon receiving the instruction set, the system control software (SCS) running on a virtual machine 310 shown in FIG. 3 performs a number of operations. First the SCS queries the Equipment Location MAC Address Table 440 to determine the location type of the edge computing device 010 using the MAC address from instruction set 075. Second, the SCS queries IP Address Table 450 using the company identified from instruction set 075 along with the location type determined in the previous step to retrieve an IP address. If the IP address scheme is dynamic, the SCS will query the DHCP server of the company associated with the request to pull an IP address and store that IP address in IP Address Table 450. Third, the SCS randomly generates a session ID 530, checks to ensure the session ID is not a duplicate of an active session and then assigns the session ID into the record in the IP Address Table 450 where the IP address originated. Fourth, the SCS queries the VM Assignment Table 460 for an existing primary and secondary virtual machine sessions that are running the software from instruction set 075 and the location type from a previous step. Once located, the SCS will assign the session ID 530 into the records representing the virtual machines that met the criteria above.

Figure 4:
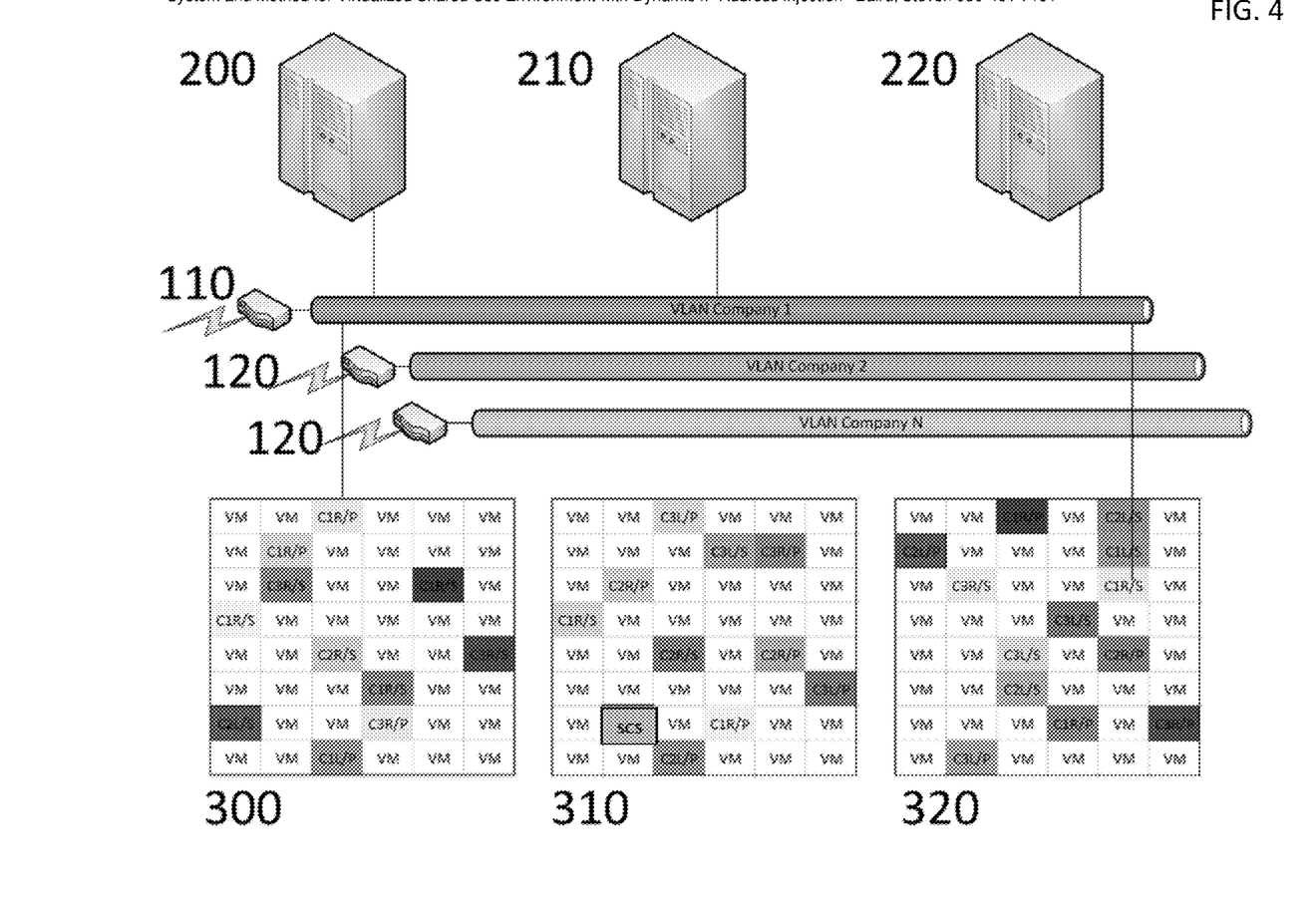
FIG. 4 is a diagram showing the IP injection into the virtual machine resulting in a connection to the company's virtual local area network through the network backplanes of the affected servers.

IP Address Injection—In FIG. 4, the SCS will take the IP address pulled from IP Address Table 450 (or derived from the company DHCP server) and inject it into the virtual machines in 300 and 320. This connects the primary and secondary virtual machines to the virtual local area network of Company1 110 and through a router back to the Company1's corporate network. The SCS completes the transformation of the edge computing device by connecting it to the virtual machines through the local area network 100 and to edge computing device 010 shown in FIG. 5.

Figure 5:
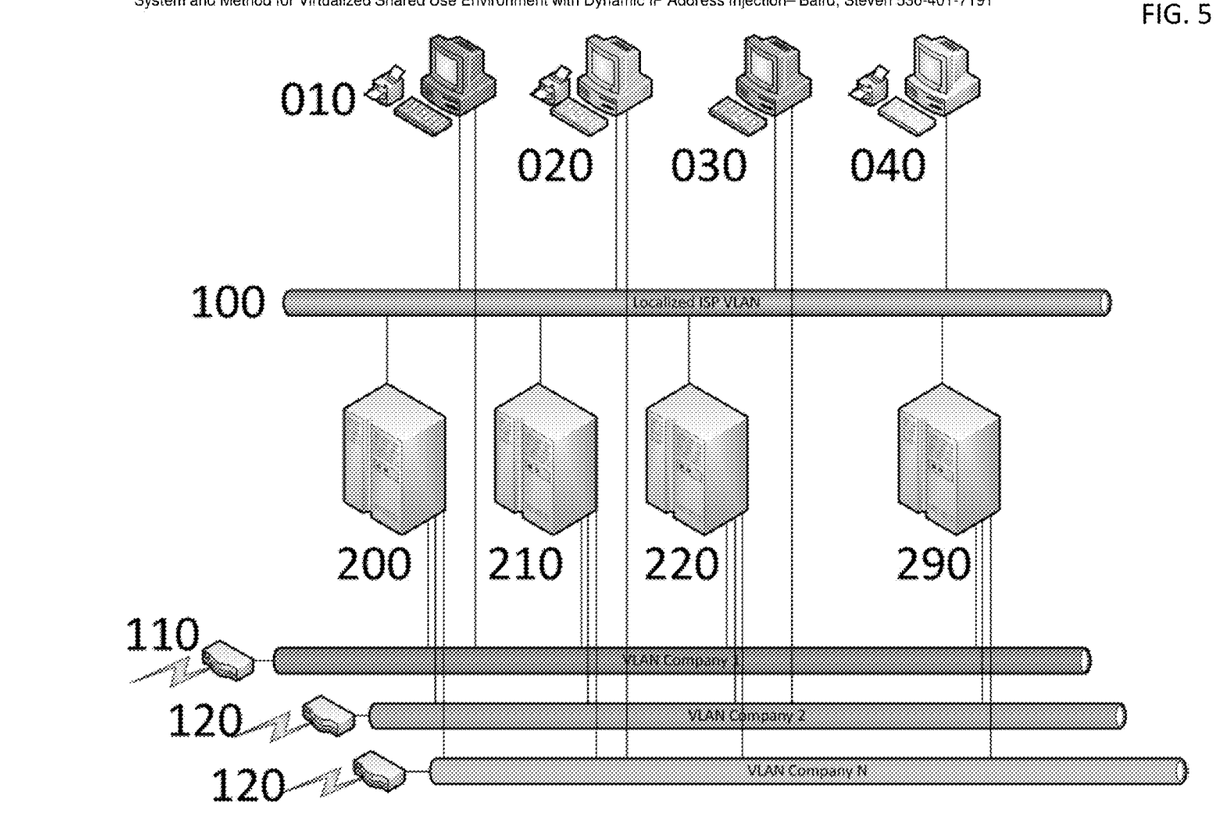
FIG. 5 is a diagram showing the edge computing device taking on the characteristics of a Company 1 software controlling device.
Figure 6:
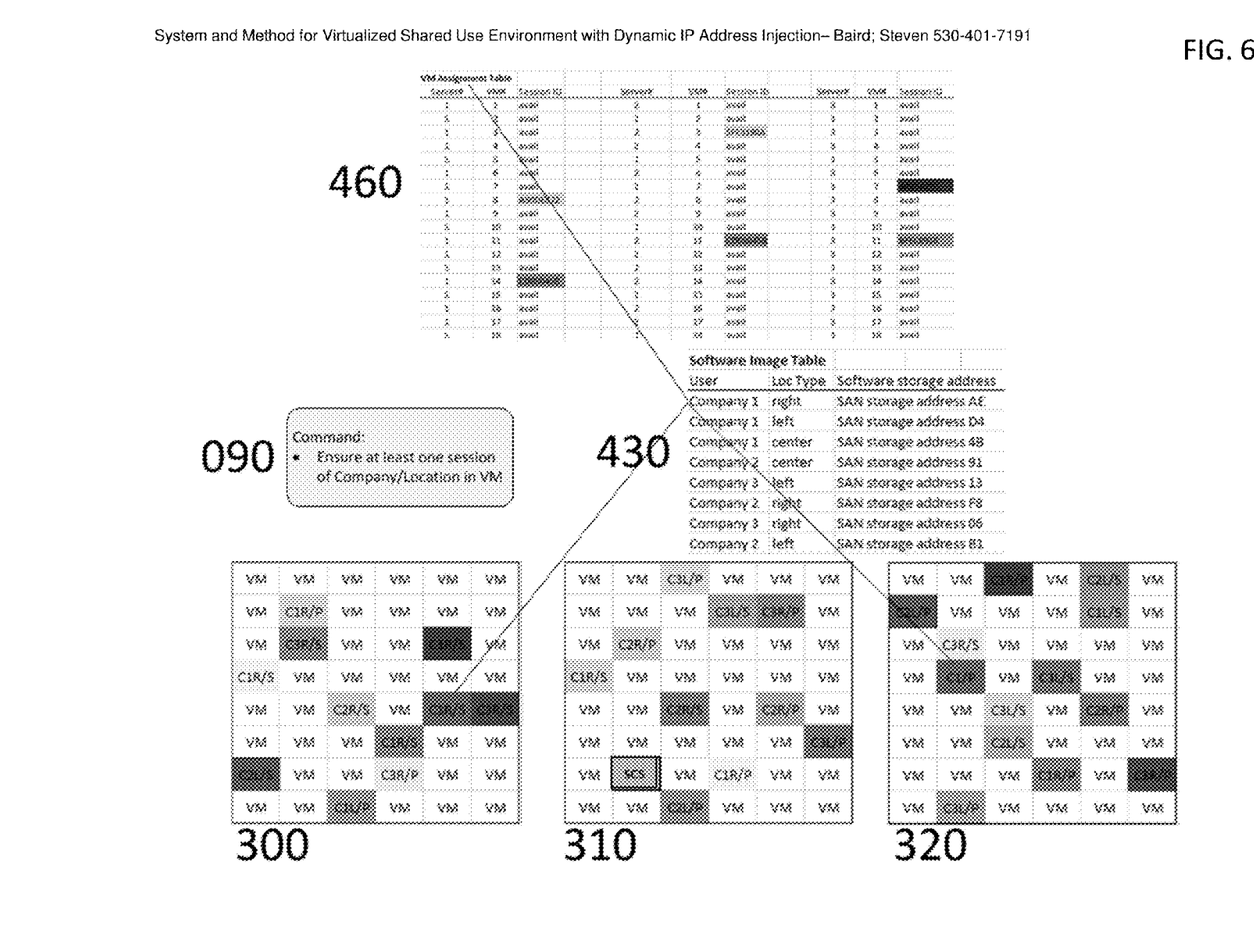
FIG. 6 is a diagram showing the system control software ensuring a minimum number of virtual machines is running and available for the next request.

Maintenance of Virtual Machines—After assigning the virtual machine pair to the control of the edge computing device 010 in FIG. 5, the SCS running on virtual machines 310 shown in FIG. 6 will check the VM Assignment Table 460 based on instruction 090 to ensure that at least one primary and secondary session of company and location just assigned exists and is available for assignment. If no sessions exist with that company and location combination, then the SCS will retrieve the software from the Software Image Table 430, start up two virtual machines with the software image based on the availability determined from the VM Assignment Table 460. The VM Assignment Table will have the new primary and secondary session marked with the company and location combination. This process of creating newly available virtual machines with the company and location combination is referred to as "spawning sessions." If more than zero instances of that company and location combination exist, no spawning will occur.

Figure 7:
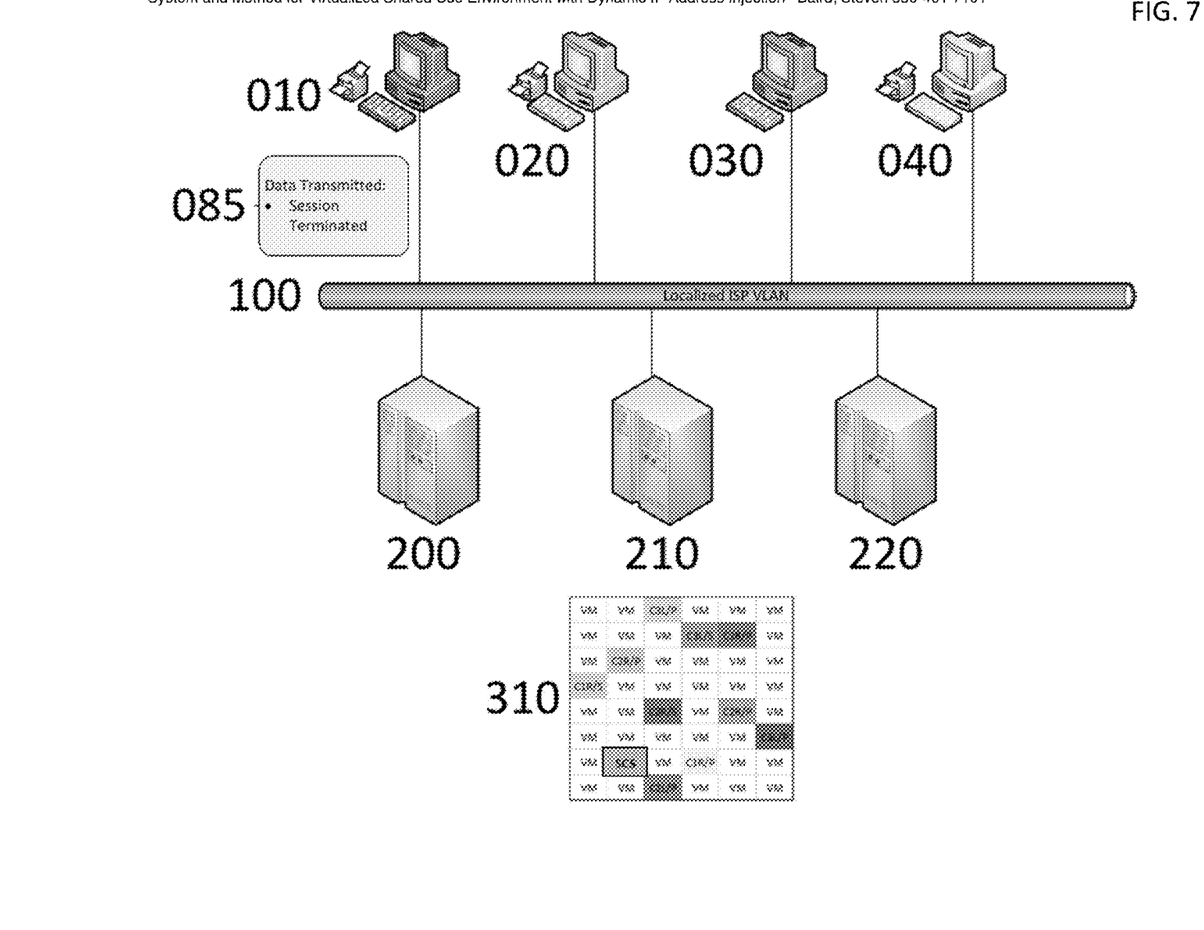
FIG. 7 is a diagram showing a request from the edge computing device to terminate the session with Company 1.
Figure 8:
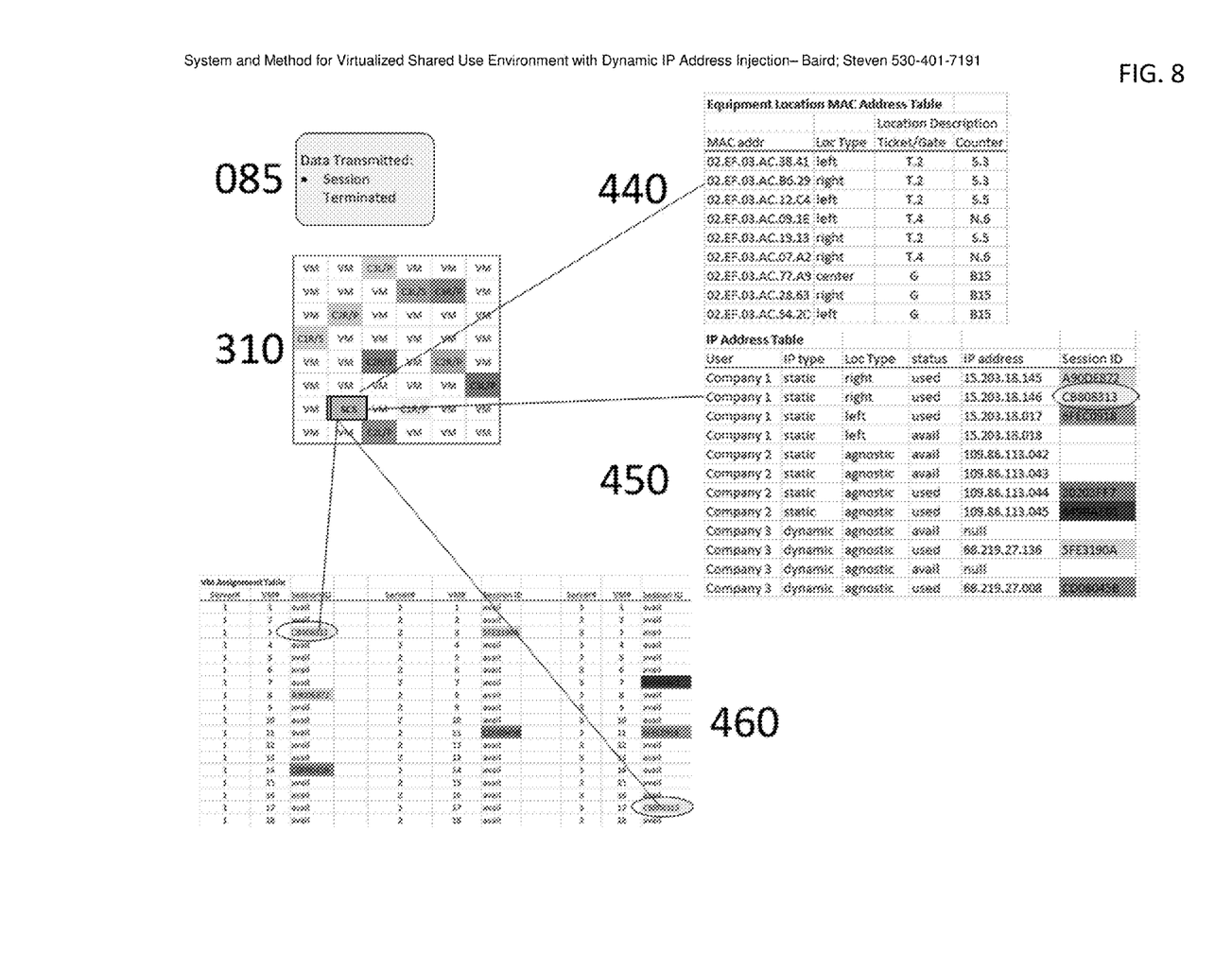
FIG. 8 is a diagram showing the system control software uncoupling the session from Company 1 and making the resources available for the next session request.
Figure 9:
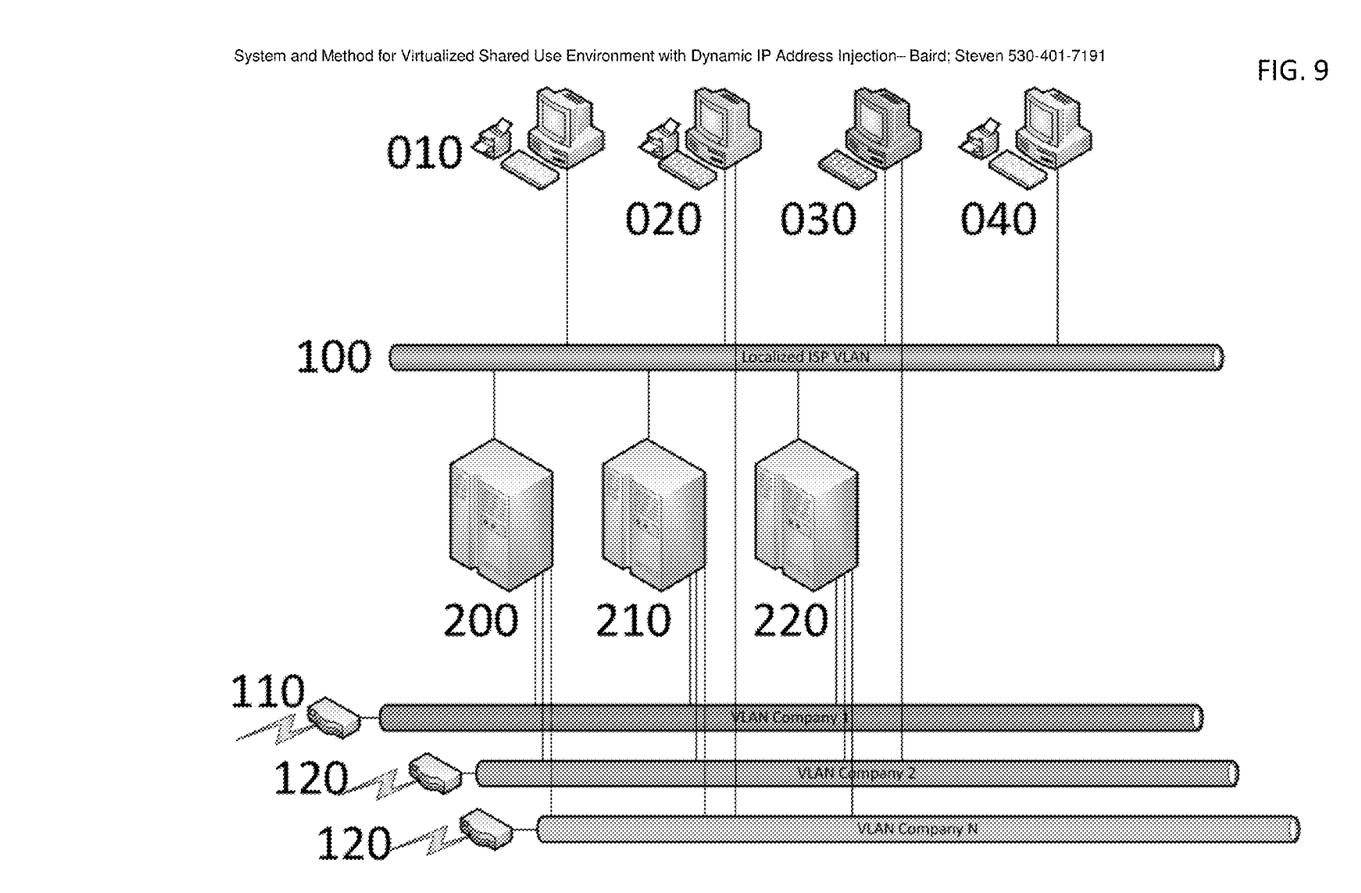
FIG. 9 is a diagram showing the session returned to a static state awaiting session selection.
Figure 10:
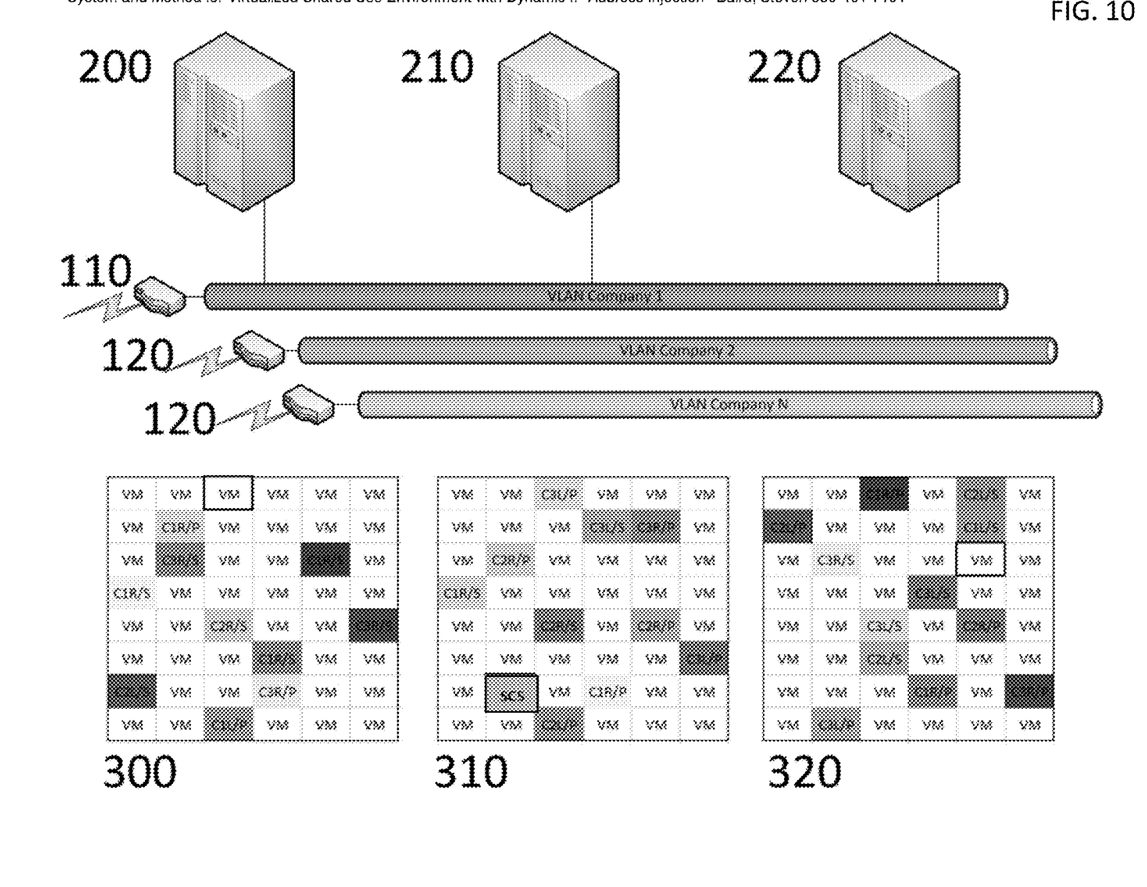
FIG. 10 is a diagram showing the virtual machines returned to the available pool.

Session Termination—When the operator using the edge equipment 010 requests the release of the company software in instruction 085 as depicted in FIG. 7, the SCS executes a number of instructions to disassemble the sessions and return the virtual machines to a static state. In FIG. 8, the SCS running on a virtual machine 310 identifies the session ID from the VM Assignment Table 460 based on the virtual machine processing the termination request. The session ID is cleared from the VM Assignment Table 460 but is stored as a variable along with the virtual session locations by the SCS to continue the session termination process. The session ID variable is used to locate the record in the IP Address Table 450 and the status of the record is set to available and the session ID is cleared. The virtual machines located using the virtual session location variables shown in FIG. 10 are returned to a static state. Edge computing device 010 is disconnected from the session and returned to a static state as shown in FIG. 9. The menu on edge computing device 010 will again show the menu 070 from FIG. 1. The last task for the SCS in 310 from FIG. 8 is to determine that at least one session of the company and location that just terminated exists in VM Assignment Table 460 or if a session pair requires spawning as outlined in D. above.

Figure 11:
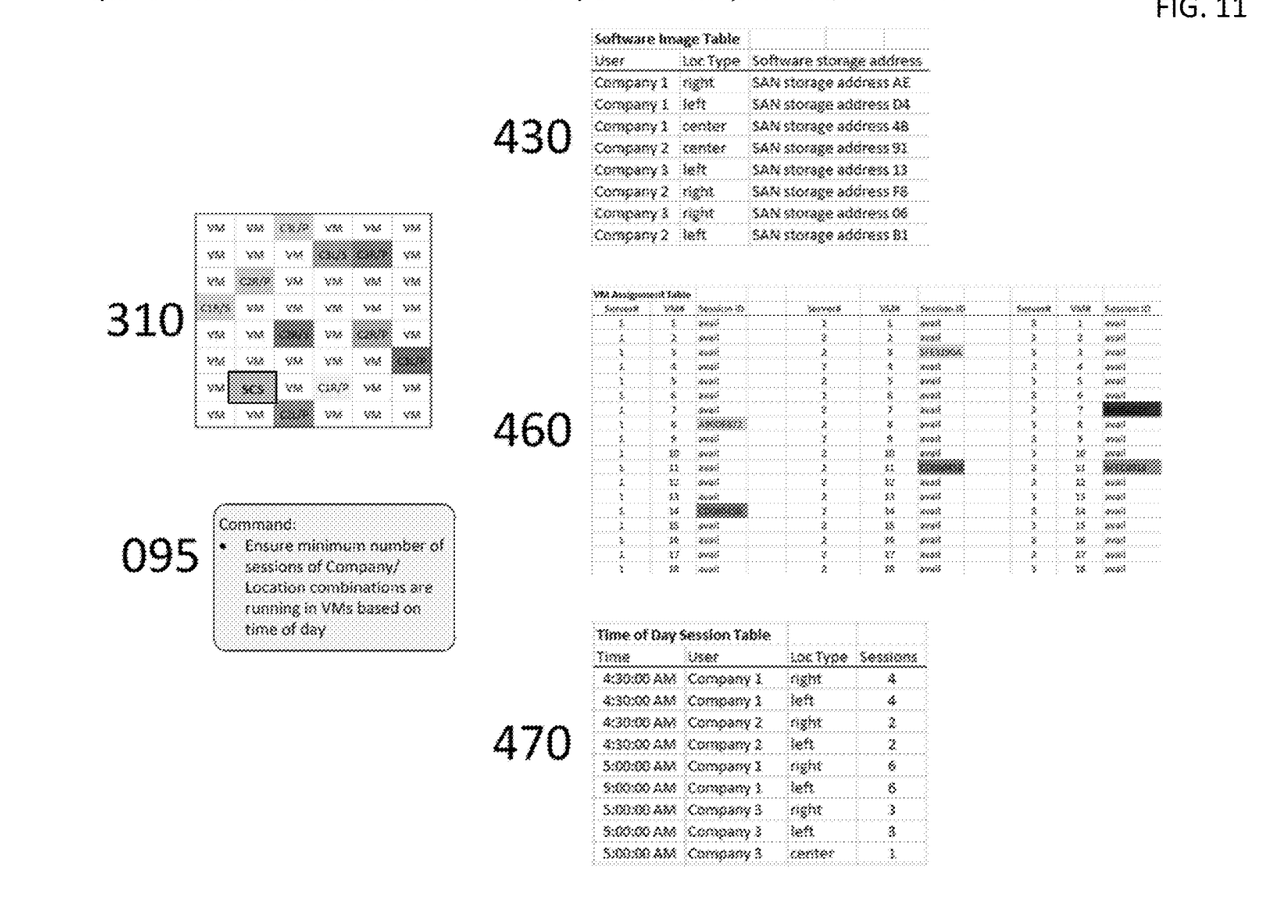
FIG. 11 is a diagram showing the system control software checking the virtual machine counts to ensure at least one instance of the company/location is running and available.

Resource Management System—The SCS running on a virtual machine 310 in FIG. 11 periodically checks (Command 095) with the Time of Day Session Table 470 to ensure a number of sessions are available based on the company and time of day. The resource management subsystem of the SCS checks the number of available sessions running based on the VM Assignment Table 460 and spawns the correct number of session pairs (primary and secondary) based on projected need which is a function of time based requirements. If Company 1 requires a minimum of four operating positions by 4:30 AM, then the SCS will ensure that at least that number of sessions exist and if not, spawn them into existence using the software images stored in the Software Image Table 430. Spawning of the appropriate session(s) will occur as outlined in D. above.

Figure 12:
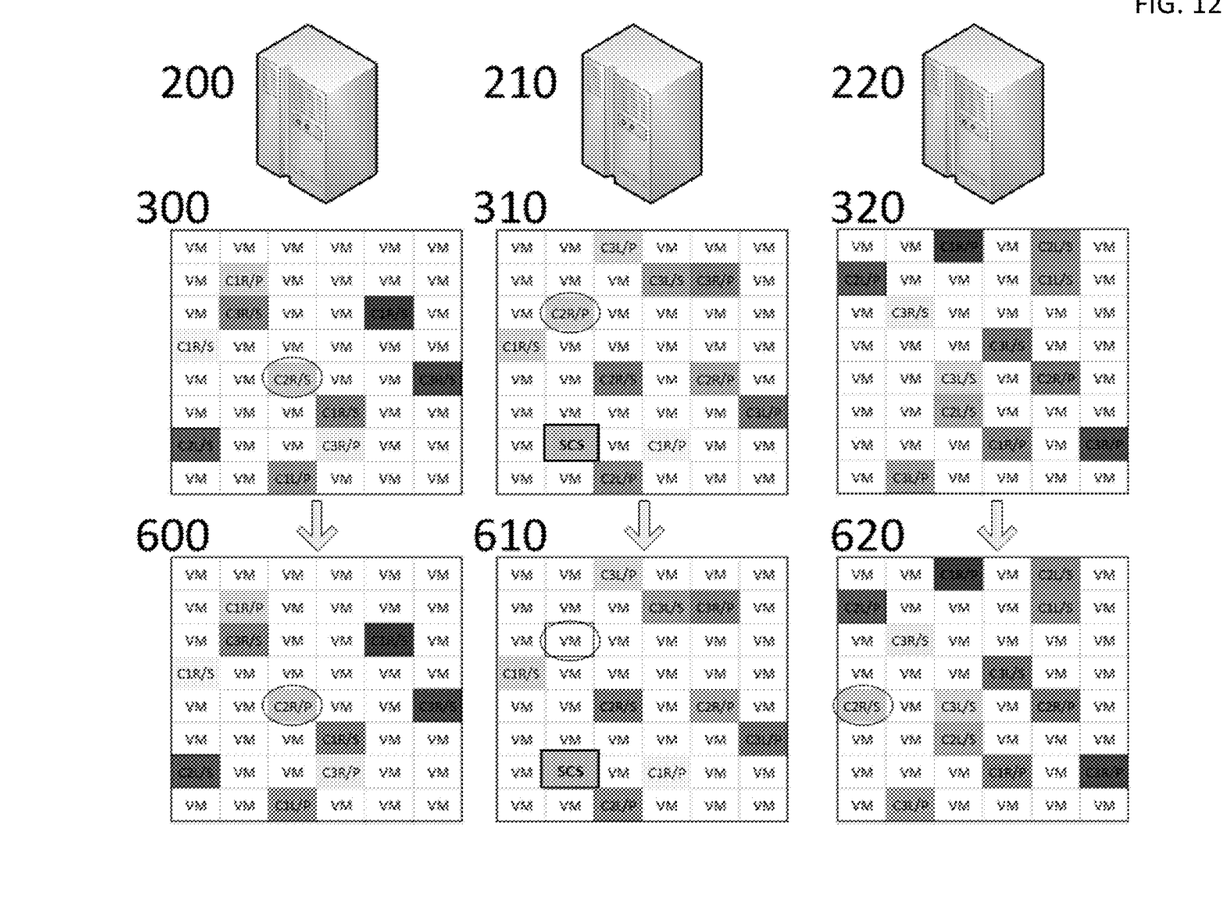
FIG. 12 is a diagram showing a failure of the primary session of a virtual machine and its recovery to a new virtual machine.

Primary Session Failure—Recovery—In FIG. 12, the primary virtual machine circled in 310 no longer responds to queries from its secondary virtual machine session pair circled in 300. The SCS in 310 will control the following process. SCS will promote the secondary virtual machine in 300 to primary as shown in 600. Next, the SCS will have a duplicate secondary virtual machine 620 that matches the primary in an available virtual machine which is determined from selecting an available virtual machine in VM Assignment Table 460 shown in FIG. 11. The duplication will include the IP address being injected into the new session. Lastly, the SCS will clear the failed virtual machine 610 and make that virtual machine available in the VM Assignment Table 460 shown in FIG. 11.

Figure 13:
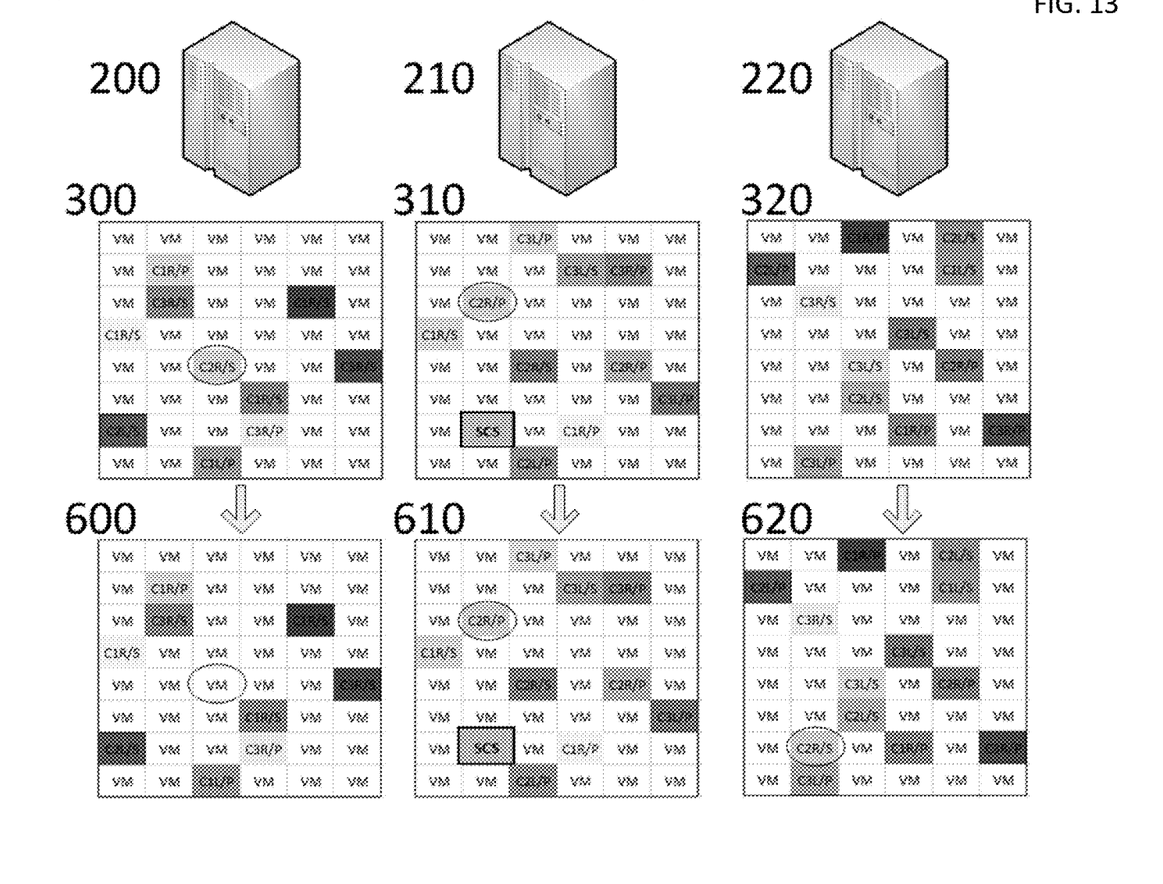
FIG. 13 is a diagram showing a failure of the secondary session of a virtual machine and its recovery to a new virtual machine.

Secondary Session Failure—Recovery—In FIG. 13, the secondary virtual machine circled in 300 no longer responds to queries from its primary virtual machine session pair circled in 310. The SCS in 310 will control the following process. The SCS will have a duplicate secondary virtual machine 620 that matches the primary in an available virtual machine which is determined from selecting an available virtual machine in VM Assignment Table 460 shown in FIG. 11. The duplication will include the IP address being injected into the new session. Lastly, the SCS will clear the failed virtual machine and make that virtual machine available 600 in the VM Assignment Table 460 shown in FIG. 11.

Figure 14:
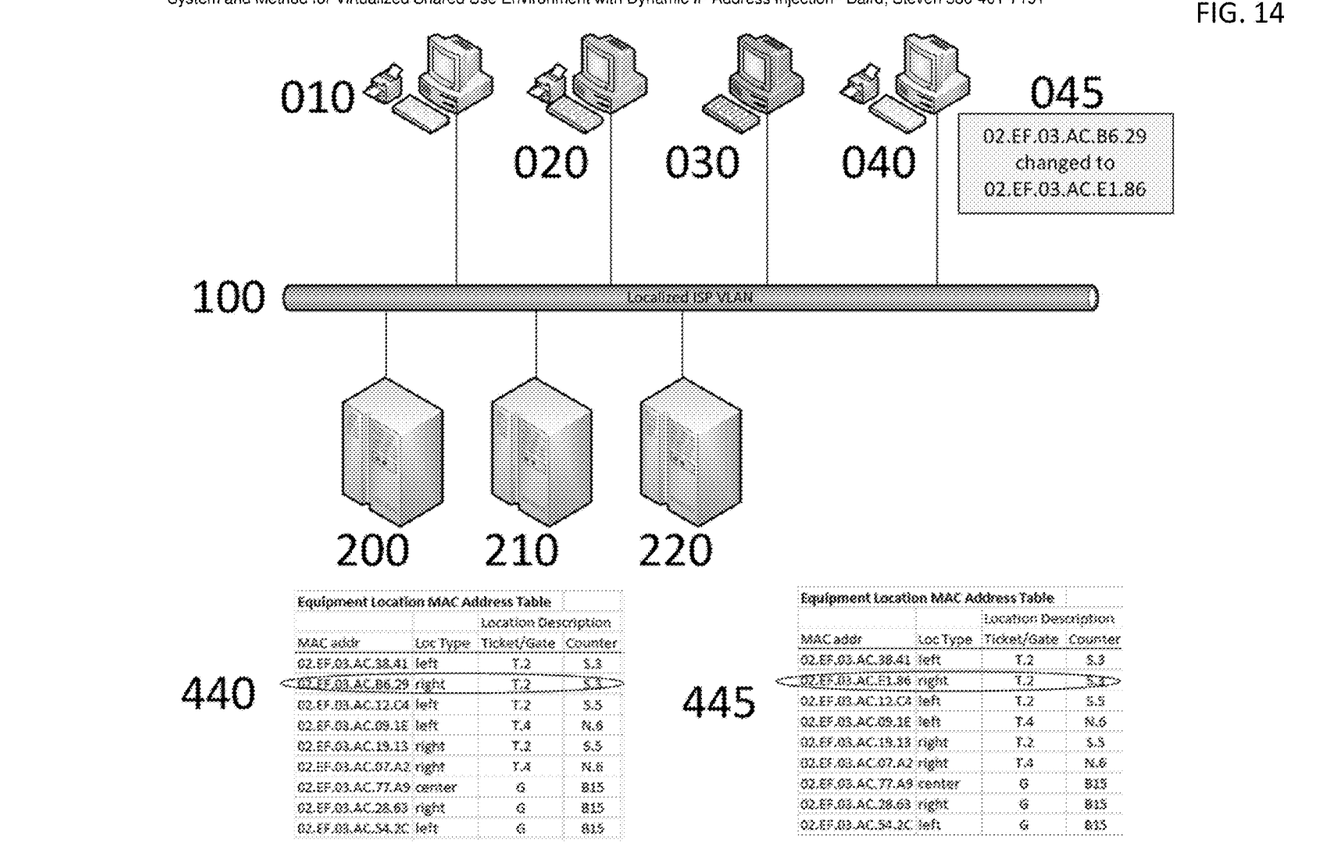
FIG. 14 is a diagram showing the changes to machine addressing tables when an edge computing device is swapped out due to failure/upgrade/replacement.

Maintenance of Edge Computing Device—In FIG. 14, after an edge computing device 040 has been replaced due to upgrade, failure or off-line maintenance, the field engineer must correct the Equipment Location MAC Address Table 440 to record the MAC address of the new edge computing device as shown in the revised Equipment Location MAC Address Table 445. The new edge computing device will boot to the menu 070 displayed in A. above.

Figure 15:
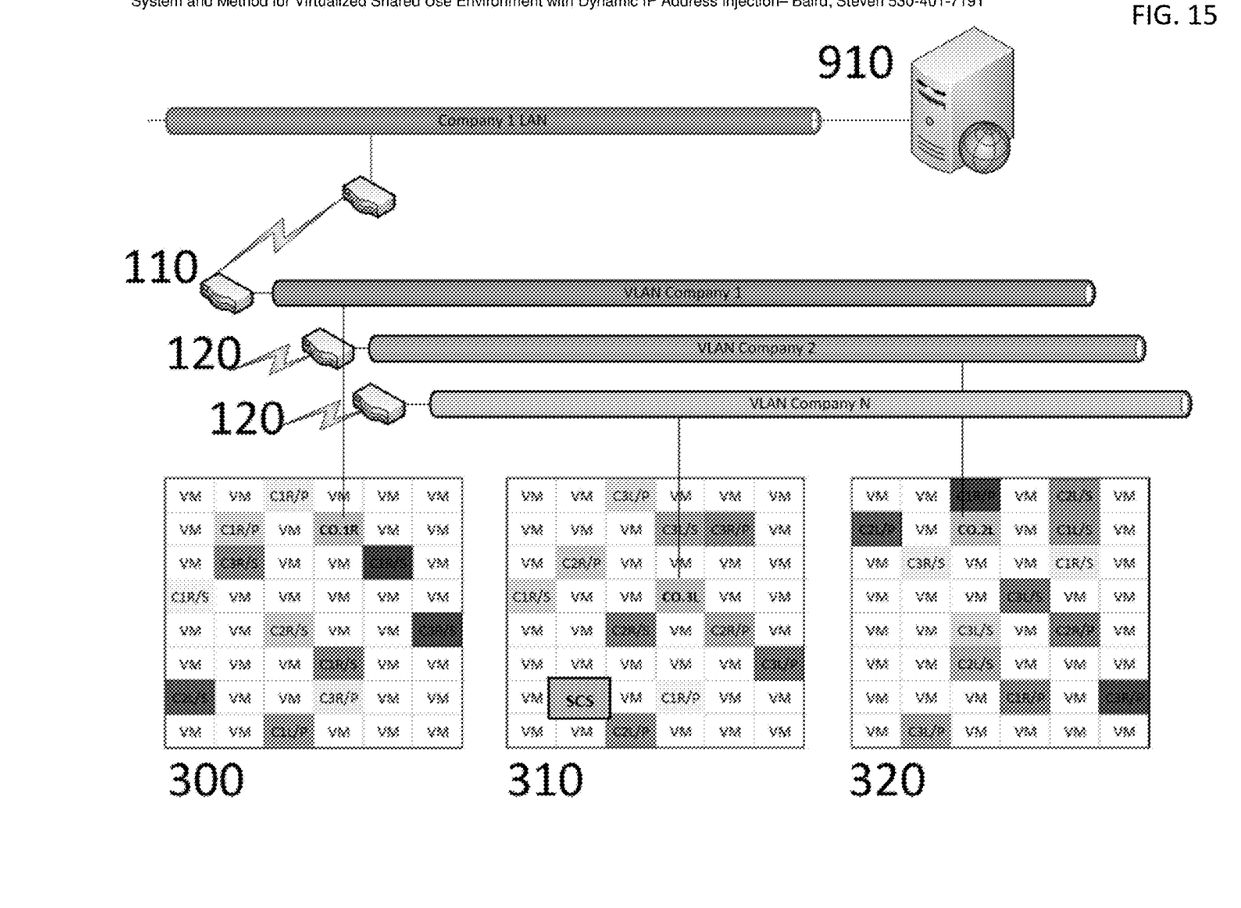
FIG. 15 is a diagram showing the update/upgrade path of software from Company 1.
Figure 16:
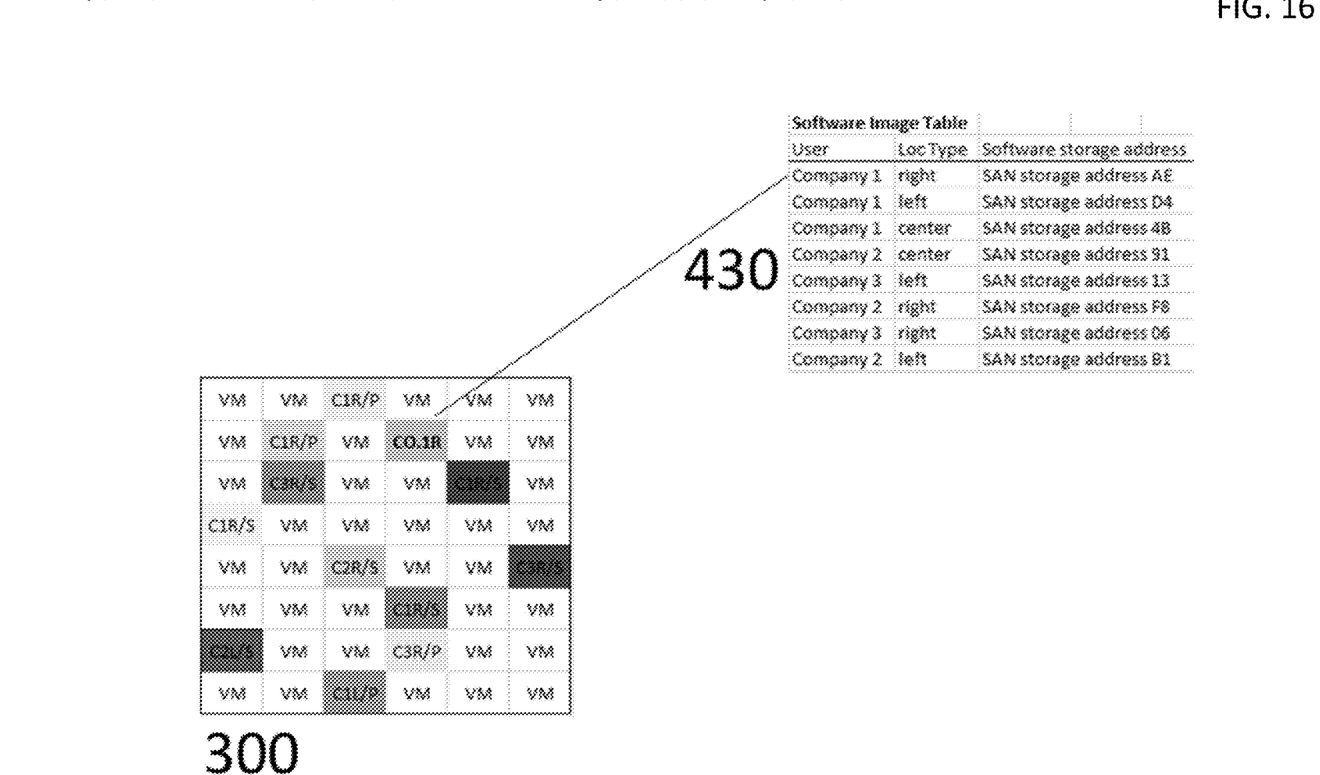
FIG. 16 is a diagram showing the system control software checking the active software to the stored image to ensure synchronicity.

Maintenance of Company Software Images—In FIG. 15, Company 1 from their servers 910 pushes down a replacement image to their image software virtual machine 300. As part of its operating instructions, the SCS 310 periodically checks the software image 300 from FIG. 16 with the software image table 430 to ensure they are identical. If not, the software image 300 overlays the stored software image 430. Each subsequent virtual machine for Company 1 will spawn from the software image 430.

What is claimed is:

1. A system for use by multiple operators using a variety of different company software over the same hardware; the system comprising:
    One or more edge computing devices, comprising the different company software for selecting;
    One or more servers running at least one virtual machine;
    A database storing hardware locations for pairing with the different company software;
    A system control software running on each said at least one virtual machine; the system control software comprising instructions stored on a non-transitory computer-readable medium, when executed, carries out the steps of:
        Directing the one or more edge computing devices to produce a company software selection menu;
        Determining the location of the a requesting edge computing device of the one or more edge computing devices when a company software is selected on the requesting edge computing device, wherein the location is denoted by machine address control address (MAC address) of the requesting edge computing device;
        Determining IP address scheme utilized by the company of the selected company software from the database;
        Retrieving and injecting a IP address into a primary and a secondary virtual machines based on the determined location of the requesting edge computing device and the company of the selected company software; wherein the primary and the secondary virtual machines establish virtualized machine sessions with the requesting edge computing device;
        Randomly generating and assigning a session ID to each of the primary and the secondary virtual machine to aid the tracking of the primary and the secondary virtual machines;
        Connecting the primary and the secondary virtual machines to a corporate VLAN associated with the company via a network card interface backplane of the server and the determined IP address;
        Promoting the secondary virtual machine as a new primary virtual machine when the primary virtual machine fails;
        Replacing the secondary virtual machine with a duplicated secondary virtual machine when the secondary virtual machine fails;
        Returning the primary and secondary virtual machines to a static state when request to release the company software is received; and
        Releasing the injected IP address, making the IP address available for another virtual machine session.

2. The system of claim 1, wherein the system control software searches several database tables for retrieving and managing of the IP address.

3. The system of claim 1, wherein the system further comprises a resource manager containing usage requirements based on time-of-day, wherein the resource manager controls the number of virtual machines running and available for each company and location based on scheduled time-of day volume expected by the company.

4. The system of claim 3, wherein the system control software further comprises instruction for carrying out the step of: querying the resource manager at regular intervals to determine a number of available virtual machine sessions.

5. The system of claim 1, wherein the different company software is updated or replaced with new software push down by the company.

6. The system of claim 1, wherein the database storing hardware locations is updated when at least one or more edge computing device is replaced or added to the system.

7. The system of claim 1, wherein the IP address is static or dynamic.

* * * * *